Jan. 31, 1967  W. T. BURR  3,301,297
LOCK NUTS

Filed July 9, 1965  2 Sheets-Sheet 2

INVENTOR:
William Thomas Burr
By Alexander Dowell
attorneys

United States Patent Office 3,301,297
Patented Jan. 31, 1967

3,301,297
LOCK NUTS
William Thomas Burr, Shoreham, England, assignor to Fine-Blanking Limited, Shoreham, England
Filed July 9, 1965, Ser. No. 470,680
9 Claims. (Cl. 151—15)

This invention relates to a screw threaded locking device such as a lock nut which can be rotated to move it along a threaded member to any desired position where it can be locked in position. The locking device may be used to lock other elements to the threaded member in any desired position or may be used as a stop element on machine tools such as milling machines, lathes and drills.

According to the invention I provide a locking device comprising a body having a screw thread, a lock member having a screw thread, said screw threads being such that the body and lock member can be rotated as a unit along a threaded member, and means whereby the body and lock member can be urged by fluid pressure in opposite directions to bind their screw threads on to the threaded member.

According to a particular constructional form of the invention, I provide a lock nut comprising a body having a threaded bore, at one end of which bore is provided an annular recess containing a lock ring having an internal thread whose pitch and diameter are the same as those of the threaded bore, a sealing ring provided within the recess between the lock ring and the end wall of the recess, and a channel in said body leading to said recess through which channel fluid pressure can be exerted against said sealing ring to urge the lock ring and the body away from each other.

Figure 1:
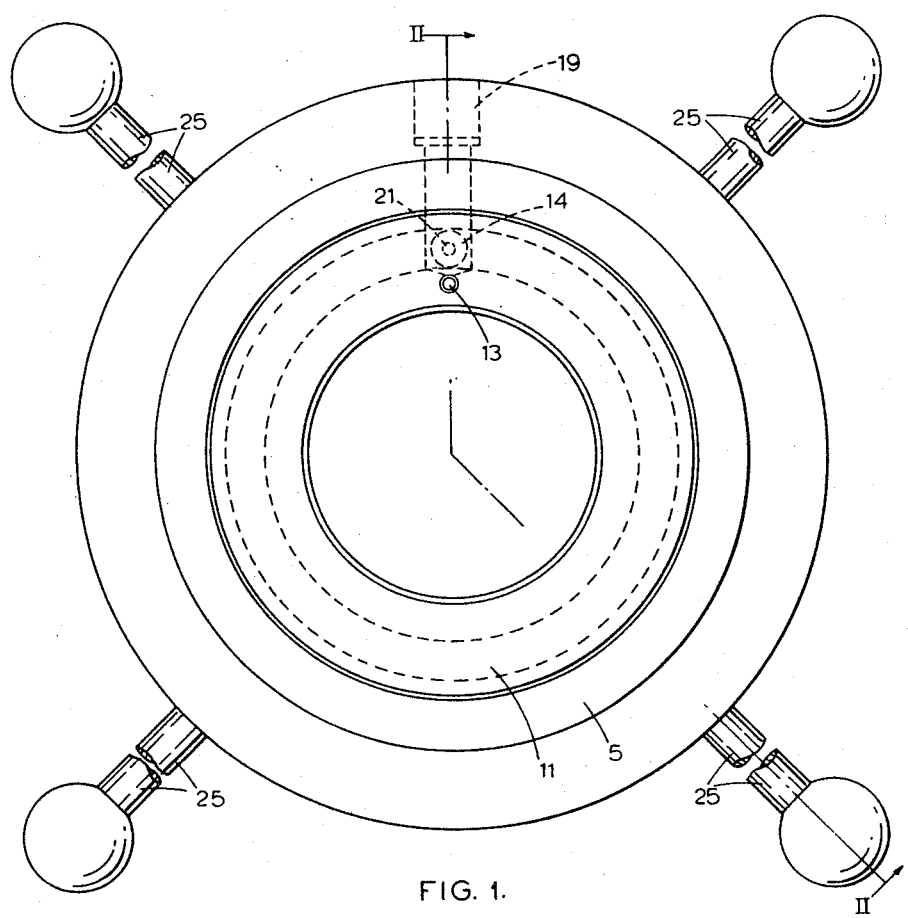
Figure 2:
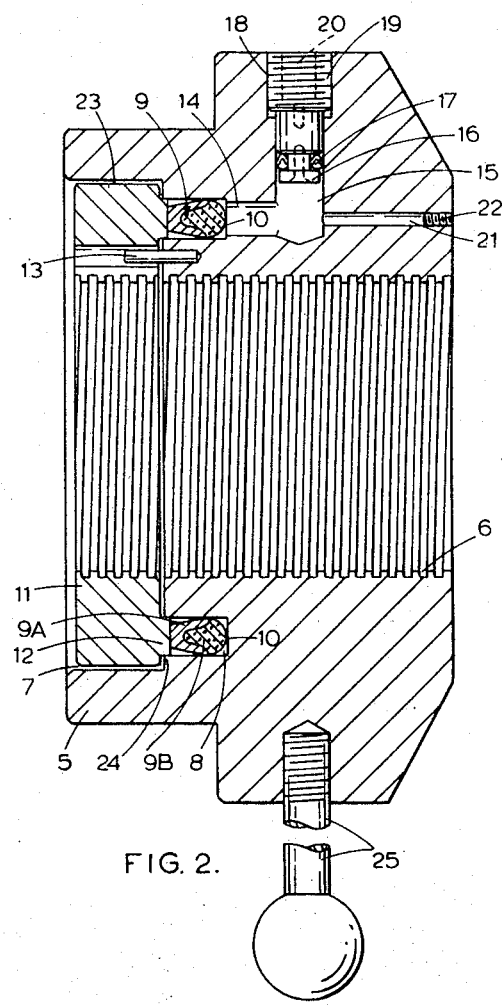

A constructional form of the invention will now be described, by way of example, with reference to the accompany drawing, wherein:

FIGURE 1 shows a front elevation of a lock nut intended for use as a stop member on a machine tool, and FIGURE 2 shows a sectional elevation taken along line II—II of FIGURE 1.

The lock nut comprises a cylindrical body 5 having a threaded bore 6 along the longitudinal axis thereof, said bore 6 having an annular recess 7 at one end forming a shoulder in which a further recess 8 is formed. Said further recess 8 receives a sealing ring 9 of a kind comprising a ring 9A of synthetic plastics material of substantially V-shaped cross-section and a resilient ring-shaped element 9B engaging the two limbs of the ring to hold said limbs in sealing engagement against the annular concentric side walls of said further recess 8. The further recess 8 is closed by an annular end wall 10 which is contained in a plane at right angles to the axis of the lock nut.

A lock ring 11 is provided in said annular recess 7 and is located concentrically with the axis by an annular spigot 12 which just enters said further recess 8 and engages said plastics ring 9A of the sealing ring 9. A pin 13 is fixed to said body in a position parallel to the axis and enters a guide bore, also parallel to the axis, which guide bore is provided in said lock ring 11 whereby relative rotational movement between the body 5 and the lock ring 11 is prevented but relative axial movement is permitted.

A channel 14 is provided in the body 5 parallel to the axis thereof and communicates with said further recess 8. The channel 14 leads into a bore 15 of larger diameter than the channel, containing a plunger 16 which is provided with a sealing element 17 closely fitting the walls of said bore containing the plunger 16. This bore 15 containing the plunger 16 is radially disposed in the body 5 and extends from the surface of the body to the channel 14 which it meets at right angles. The plunger bore 15 has a threaded portion 18 containing a grub screw 19 having a recess 20 for receiving an Allen key. The channel 14 and the plunger bore 15 can be filled with hydraulic fluid, such as grease, by way of a filling channel 21 which is disposed coaxially with the first mentioned channel 14 and which extends from the end of the body remote from the recess to the juncture of the main channel and the plunger bore. The filling channel is stopped by a removable threaded plug 22.

The lock ring 11 fits with a small clearance 23 in the annular recess whereby axial movement thereof is unimpeded and has a length between 75 to 95 percent of the length of said annular recess 7. The lock ring 11 is in contact with the end wall 24 of the annular recess but a 5 to 60 thousandths of an inch end play may be provided.

A number of radially extending handles 25 may be provided on the body 5 to facilitate rapid rotation of the lock nut.

In use the lock nut is rotaated until the required position along its threaded shaft is achieved whereupon the grub screw 19 is turned to drive the plunger 16 along its bore 15. The fluid within the channel is thus compressed forcing the sealing ring 9 against the lock ring 11 which is moved axially a few thousandths of an inch. The lock ring 11 and the body 5 are therefore forced apart, their threaded portions being forced into rigid engagement with the threads on the shaft.

I claim:
1. A lock nut comprising a body having a threaded bore, at one end of which bore is provided an annular recess containing a lock ring having an internal thread whose pitch and diameter are the same as those of the thread of the threaded bore, a sealing ring provided within the recess between the lock ring and the end wall of the recess, and a channel in said body leading to said recess through which channel fluid pressure can be exerted against said sealing ring to urge the lock ring and the body away from each other.
2. A lock nut as claimed in claim 1 wherein a pin is fixed to the body in a position parallel to the axis and enters a guide bore, also parallel to the axis, which guide bore is provided in said lock ring whereby relative rotational movement between the body and the lock-ring is prevented but relative axial movement is permitted.
3. A lock nut as claimed in claim 1 wherein a handle extends radially from the body.
4. A lock nut as claimed in claim 1 wherein said annular recess forms a shoulder in which a further recess is provided, the sealing ring being located in said further recess.
5. A lock nut as claimed in claim 4 wherein the sealing ring comprises a ring of synthetic plastics material of substantially V-shaped cross-section and a resilient ring-shaped element engaging the two limbs of the ring to hold said limbs in sealing engagement against the annular concentric side wall of said further recess.
6. A lock nut as claimed in claim 4 wherein the lock ring is located concentrically with the annular recess by an annular spigot which just enters said further recess and engages the sealing ring.
7. A lock nut as claimed in claim 4 wherein the channel in said body is parallel to the axis of the body and communicates at one end with the further recess and at the other end with a plunger bore, of larger diameter than the channel, containing a plunger which is provided with a sealing element closely fitting the walls of said bore.
8. A lock nut as claimed in claim 7 wherein the plunger bore is radially disposed in the body and extends from the surface of the body to the channel which it meets at right angles and wherein the plunger bore has a thread- ed portion containing a grub screw having a recess for receiving an Allen key.

9. A lock nut as claimed in claim 7 wherein a filling channel is disposed coaxially with the first-mentioned channel, which filling channel is stopped by a removable threaded plug.

References Cited by the Examiner

UNITED STATES PATENTS

| | | | |
|---|---|---|---|
| 2,430,677 | 11/1947 | Hobart | 85—32 |
| 2,571,265 | 10/1951 | Leufven | 85—32 |

FOREIGN PATENTS

| | | |
|---|---|---|
| 1,217,170 | 12/1959 | France. |
| 510,144 | 7/1939 | Great Britain. |
| 908,360 | 10/1962 | Great Britain. |
| 991,783 | 5/1965 | Great Britain. |

CARL W. TOMLIN, *Primary Examiner.*

MARION PARSONS, Jr., *Examiner.*